(12) United States Patent
Relot et al.

(10) Patent No.: US 9,726,925 B2
(45) Date of Patent: Aug. 8, 2017

(54) METHOD FOR PRODUCING A MULTIPLE GLAZING UNIT WITH VARIABLE DIFFUSION BY PDLC LAYER AND A MULTIPLE GLAZING UNIT WITH A PDLC LAYER PRODUCED ACCORDING TO SAID METHOD

(71) Applicant: Cardinal IG Company, Eden Prairie, MN (US)

(72) Inventors: Emmanuelle Relot, Paris (FR); Nicolas Le Houx, Compiegne (FR); Jingwei Zhang, Massy (FR)

(73) Assignee: Cardinal IG Company, Eden Prairie, MN (US)

( * ) Notice: Subject to any disclaimer, the term of this patent is extended or adjusted under 35 U.S.C. 154(b) by 220 days.

(21) Appl. No.: 14/409,941

(22) PCT Filed: Jun. 17, 2013

(86) PCT No.: PCT/FR2013/051411
§ 371 (c)(1),
(2) Date: Dec. 19, 2014

(87) PCT Pub. No.: WO2013/190225
PCT Pub. Date: Dec. 27, 2013

(65) Prior Publication Data
US 2015/0138489 A1 May 21, 2015

(30) Foreign Application Priority Data
Jun. 22, 2012 (FR) ...................................... 12 55955

(51) Int. Cl.
*G02F 1/1333* (2006.01)
*G02F 1/1339* (2006.01)
(Continued)

(52) U.S. Cl.
CPC .............. *G02F 1/1334* (2013.01); *E06B 3/67* (2013.01); *G02F 1/1339* (2013.01); *G02F 2202/023* (2013.01)

(58) Field of Classification Search
CPC ......... E06B 3/67; G01B 11/165; G01B 11/18; G02F 1/1334; G02F 1/1339; G02F 2202/023
See application file for complete search history.

(56) References Cited

U.S. PATENT DOCUMENTS 4,891,152 A 1/1990 Miller et al.
5,305,126 A * 4/1994 Kobayashi ......... C09K 19/3852
349/183
(Continued)

FOREIGN PATENT DOCUMENTS

EP 0575791 A1 12/1993
EP 0730188 A2 9/1996
(Continued)

OTHER PUBLICATIONS

Chen et al., "Electra-Optical Properties of Polymer Stabilized Cholesteric Texture Normal-Mode Light Shutter From Flexible Monomers," ALCOM Tech Report XI, 2000, pp. 223-229.
(Continued)

*Primary Examiner* — Huyen Ngo
(74) *Attorney, Agent, or Firm* — Fredrikson & Byron, P.A.

(57) ABSTRACT

A method for producing a multiple glazing unit with variable diffusion by liquid crystals can include applying a pre-seal on an internal face of a first substrate to form a strip delimiting a space. The method can further include depositing a liquid crystal composition containing liquid crystals in a polymer matrix on the delimited space. In some examples, the first substrate is assembled with a second substrate and calendared or pressed. Thereafter, the resulting
(Continued)

Figure 1:
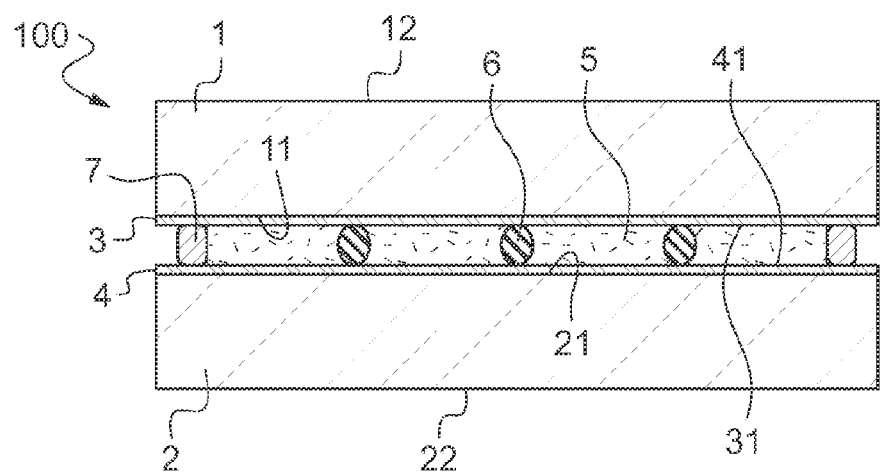

assembly is irradiated and/or heated to simultaneously cross-link the pre-seal and polymerize the liquid crystal composition.

20 Claims, 2 Drawing Sheets

(51) Int. Cl.
  *G02F 1/1334* (2006.01)
  *E06B 3/67* (2006.01)

(56) References Cited

U.S. PATENT DOCUMENTS

| | | | |
|---|---|---|---|
| 5,408,353 | A | 4/1995 | Nichols et al. |
| 5,686,017 | A | 11/1997 | Kobayashi et al. |
| 5,835,174 | A * | 11/1998 | Clikeman ............ C09K 19/544 349/86 |
| 5,958,290 | A | 9/1999 | Coates et al. |
| 6,271,899 | B1 | 8/2001 | Lewis et al. |
| 6,295,102 | B1 | 9/2001 | Higa et al. |
| 6,429,961 | B1 | 8/2002 | Harary et al. |
| 6,661,486 | B1 | 12/2003 | Faris et al. |
| 7,342,704 | B2 | 3/2008 | Yano |
| 7,525,604 | B2 | 4/2009 | Xue |
| 7,755,829 | B2 | 7/2010 | Powers et al. |
| 7,837,897 | B2 | 11/2010 | Zhang et al. |
| 8,102,478 | B2 | 1/2012 | Xue |
| 8,187,682 | B2 | 5/2012 | Albrecht et al. |
| 9,212,291 | B2 * | 12/2015 | Beyers ..................... B32B 7/12 |
| 2001/0033400 | A1 | 10/2001 | Sutherland et al. |
| 2003/0193709 | A1 | 10/2003 | Mallya et al. |
| 2007/0172971 | A1 * | 7/2007 | Boroson ............. H01L 51/5246 438/26 |
| 2009/0068455 | A1 | 3/2009 | Albrecht et al. |
| 2009/0103027 | A1 | 4/2009 | Hughes et al. |
| 2009/0219603 | A1 | 9/2009 | Xue |
| 2009/0290078 | A1 | 11/2009 | Yang et al. |
| 2010/0118380 | A1 | 5/2010 | Xue |
| 2010/0279125 | A1 | 11/2010 | Buyuktanir et al. |
| 2010/0294679 | A1 | 11/2010 | Griffiths et al. |
| 2011/0102730 | A1 | 5/2011 | Lee et al. |
| 2013/0093969 | A1 | 4/2013 | Li et al. |

FOREIGN PATENT DOCUMENTS

| | | |
|---|---|---|
| EP | 2128688 A1 | 12/2009 |
| JP | 2006178053 A | 7/2006 |
| JP | 2008116825 A | 5/2008 |
| JP | 2012030980 A | 2/2012 |
| WO | 2012028823 A1 | 3/2012 |

OTHER PUBLICATIONS

"Liquid Crystal Glass," retrieved from http://www.glazette.com/Glass-Knowledge-Bank-70/Liquid-Crystal-Glass.html on Oct. 1, 2013, 2 pages.
"Switchable Intelligent Glass—SGG Priva-lite Electrochromatic Glass," Saint Gobain Glass India, retrieved from http://in.saint-gobain-glass.com/b2c/default.asp?nav1=pr&nav2=single%20pane&id=18978 on Oct. 1, 2013, 1 page.
"Transparent Display," Kent Optronics, retrieved from http://kentoptronics.com/transparent.html on Oct. 1, 2013, 1 page.
International Search Report from International Application PCT/FR2013/051411, mailed Aug. 8, 2013, 6 pages.

* cited by examiner

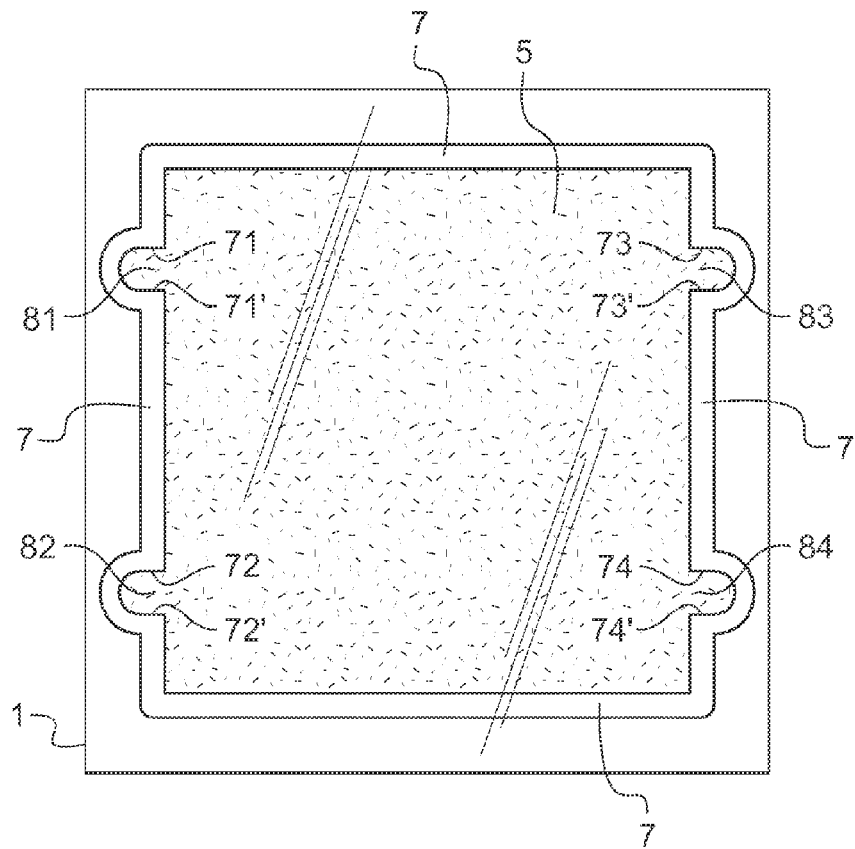
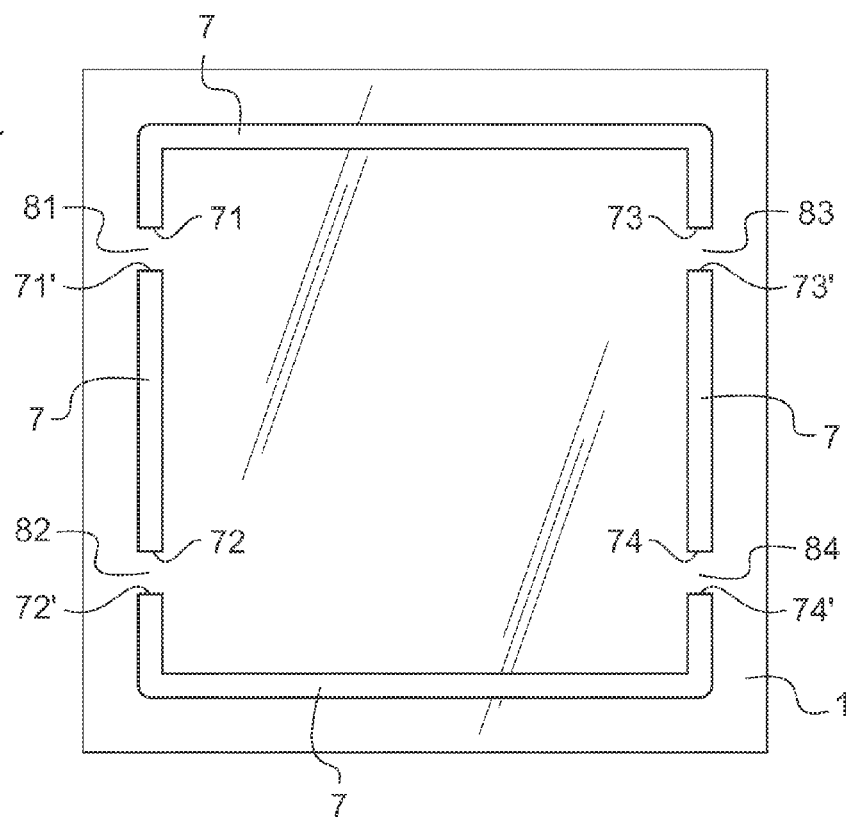

METHOD FOR PRODUCING A MULTIPLE GLAZING UNIT WITH VARIABLE DIFFUSION BY PDLC LAYER AND A MULTIPLE GLAZING UNIT WITH A PDLC LAYER PRODUCED ACCORDING TO SAID METHOD

The invention relates to the field of electrically controllable glazing units with variable optical properties and more particularly relates to a glazing unit with variable diffusion by liquid crystals, provided with a layer of PDLC liquid crystals between two substrates.

Glazing units are known in which certain characteristics can be modified under the effect of an appropriate electrical supply, quite particularly the transmission, absorption, and reflection of electromagnetic radiation at certain wavelengths, notably in the visible and/or in the infrared, or light scattering.

The electrically controllable glazing unit with liquid crystals can be used everywhere, both in the construction sector and in the automobile sector, whenever the view through the glazing unit must be prevented at given times.

Document WO2012/028823 discloses a liquid-crystal multiple glazing unit comprising:
first and second sheets of flat float glass held at the edge of their internal faces by an epoxy seal,
on the internal faces of the first and second sheets of glass, first and second electrodes in the form of electrically conducting transparent layers of ITO provided with energy supply,
and, between the first and second electrodes, a PDLC (Polymer Dispersed Liquid Crystal) layer containing liquid crystals, such as the compound 4-((4-ethyl-2,6-difluorophenyl)-ethinyl)-4'-propylbiphenyl and 2-fluoro-4,4'-bis(trans-4-propylcyclohexyl)biphenyl for example sold by the company Merck under the reference MDA-00-3506, dispersed as microdroplets in polymer material and containing transparent spacers, the PDLC layer alternating reversibly between a transparent state and a translucent state by application of an alternating electric field.

The coating of liquid crystals is produced by an operation called dropwise filling.

The material that will form the adhesive seal is moreover applied as a strip in nonpolymerized form, directly along the edge of the sheet of glass before or after deposition of the liquid-crystal layer with the nonpolymerized matrix.

This is followed by calendering or, as a variant, pressing.

The polymerizations of the material for the seal and of the matrix are then carried out.

One aim of the invention consists of developing a liquid-crystal multiple glazing unit of the PDLC type with improved electrical and optical performance while manufacture remains compatible with the industrial requirements.

For this purpose, the present invention proposes firstly a method for producing a multiple glazing unit with variable diffusion by liquid crystals comprising:
first and second sheets of glass—preferably mineral glass rather than organic glass—held at the edge of their main internal faces by an adhesive seal based on crosslinked polymer, said seal delimiting a space called active space,
on the internal faces, first and second electrodes provided with energy supply, the first electrode being transparent and/or the second electrode being transparent,
and in the active space, between the first and second electrodes (preferably directly on the first electrode, or on a thin top layer, notably dielectric, deposited on the first electrode), a PDLC layer containing liquid crystals in the form of (micronic) droplets dispersed in a polymer matrix, typically the layer of liquid crystals alternating reversibly between a translucent state and a (more) transparent state (optionally colored) by application of an alternating electric field (preferably sinusoidal), the transparent state being maintained by the application of said alternating field, the PDLC layer being in contact with the adhesive seal and preferably comprising spacers, the seal also being between the first and second electrodes, the method comprising the following steps (in this order):
a) application, on the first electrode (directly on the first electrode or on a top layer), of a material called pre-seal containing at least one precursor of the crosslinked polymer forming the seal, so as to form a strip, optionally with vent(s), delimiting a space (which is the active space in the final product),
(b) deposition, on the first electrode (directly on the first electrode or on a top layer), of a liquid crystal composition containing a precursor of the polymer of the matrix, it being possible to reverse the order of steps (a) and (b)
(c) assembly of the first and second glass sheets, with the internal faces opposite, by calendering or pressing, the pre-seal as a strip then being in contact with the composition,
(d) after assembly, irradiation with ultraviolet radiation (UV) and/or heating of the assembly thus obtained so as to obtain crosslinking of the pre-seal and polymerization of the composition.

The pre-seal is based on acrylate and is free from precursor of epoxy polymer, the composition is based on acrylate and is preferably free from precursor of epoxy polymer.

The applicant first selected a PDLC in a matrix of acrylate-based polymer with the aim of optimizing the optical performance, in particular as little blurring as possible in the transparent state ("ON" state, therefore supplied electrically).

The applicant then produced a first glazing unit following the steps as described in the prior art and found an abnormal electricity consumption of the glazing unit.

The applicant then discovered that the cause of the electrical malfunction of the product was the use of the epoxy adhesive seal, which is chemically incompatible with the acrylate matrix and which surprisingly proves to be a poor electrical insulator. Now, a conventional epoxy seal is electrically insulating once crosslinked and therefore does not consume electricity. That is why the applicant identified that at least at the interface between the seal and the matrix, the epoxy seal is not, or at least not sufficiently, crosslinked to be electrically insulating, which is the cause of the electrical faults. Moreover, polymerization of the matrix can itself be hampered by the presence of the precursors of epoxy polymer in the contact zone (the perimeter of the matrix) with the strip.

Thus, it seems that there is competition of reactivity between the species that are present: incomplete crosslinking, or even cross-polymerization between the acrylate matrix and the epoxy. One possible explanation is that the ester function RCOOR' such as is present in an acrylate reacts with an epoxide, which is a "ring" between two carbons and one oxygen (otherwise called glycidyl or epoxy). Therefore we should avoid bringing them in contact. Moreover, it is undesirable to cut the strip after manufacture (which would be one alternative) notably to maintain the mechanical durability provided by the strip.

As this first glazing unit did live up to its promises, the applicant then made a second glazing unit, corresponding to the invention, with a formulation based on precursors of acrylate polymer for the seal, and without precursors of epoxy polymer.

The choice of one and the same acrylate base is therefore the surest way to avoid the possibility of parasitic chemical reactions that are likely to occur when elements of different families are used for the seal and the PDLC matrix. And, in fact, the electricity consumption of the second glazing unit, according to the invention, drops dramatically. Measurements of the electric power consumed were carried out with a wattmeter on the first and second glazing units (liquid crystals+acrylate matrix) with seals of epoxy and acrylate respectively. The results show that the electricity consumption of the second glazing unit with acrylate adhesive seal is greatly reduced and even equal to that of an identical glazing unit but without the adhesive seal. In contrast, the electricity consumption is far higher for the glazing unit with epoxy adhesive seal, typically at least two or even three times higher.

For simple assurance of crosslinking of the seal at the interface with the matrix, the applicant thus selected an adhesive seal identical to that of the matrix, therefore acrylate, preferred to other known adhesive seals of polyurethane or of polyamide.

This judicious choice of acrylate-based seal moreover makes it possible to keep the method of manufacture of the prior art unchanged (deposition, on glass substrate, of precursors of seal and matrix polymers before assembling the glasses and polymerizations), which is particularly suitable for an industrial line.

Polymerization and crosslinking of the matrix and of the seal are by supply of energy rather than in the air for better control and a short duration, quite particularly with UV.

Naturally, the pre-seal does not comprise polymer precursor that can form an epoxy-acrylate copolymer and the composition preferably does not comprise polymer precursor able to form an epoxy-acrylate copolymer.

"Acrylate-based pre-seal" means that the pre-seal comprises, in total weight of polymer precursor(s), at least 50 wt % of precursor(s) of acrylate polymer.

Preferably the pre-seal contains, in total weight of polymer precursor(s), at least 60% or even at least 70% and preferably at least 80% or even at least 90% of precursor(s) of acrylate polymer and even 100%.

"Acrylate-based composition" means that the composition comprises, in total weight of polymer precursor(s), at least 50% of precursor(s) of acrylate polymer.

Preferably the composition according to the invention contains, in total weight of polymer precursor(s), at least 60% or even at least 70% and preferably at least 80% of precursor(s) of acrylate polymer.

Conventionally, polymer precursor means: monomer, dimer, oligomer, prepolymer etc.

Preferably, the pre-seal according to the invention comprises at least one acrylate oligomer (or more broadly an acrylate prepolymer, notably an acrylate polymer that has reactive groups) and even at least one acrylate monomer. Preferably the composition comprises at least one acrylate oligomer (or more broadly a prepolymer) and even at least one acrylate monomer.

Alternatively, the pre-seal according to the invention at the very least can comprise, in total weight of precursors of polymers, less than 5 wt % of precursor(s) of epoxy polymer or better still less than 1 wt % of precursor(s) of epoxy polymer. And preferably, in this alternative, the composition according to the invention at the very least can comprise, in total weight of precursors of polymers, less than 5 wt % of precursor(s) of epoxy polymer or better still less than 1 wt % of precursor(s) of epoxy polymer.

The acrylates undergo radical chain polymerization, in contrast to anionic polymerization, as for epoxy.

In addition to the (preferably total) elimination of precursor of epoxy polymer, as a precaution, in a preferred embodiment, the pre-seal is free from polymer precursor(s) polymerizing ionically and preferably the composition is free from polymer precursor(s) polymerizing ionically.

Alternatively, the pre-seal according to the invention at the very least can comprise, in total weight of precursors of polymers, less than 5 wt % of precursor(s) of polymer(s) polymerizing ionically or better still less than 1 wt % of polymer precursor(s) polymerizing ionically.

The pre-seal according to the invention can contain one or more polymer precursor(s) undergoing radical chain polymerization different from an acrylate but it is preferred quite particularly that the pre-seal only contains one or more acrylates as polymer precursor(s) undergoing radical chain polymerization.

The composition according to the invention can contain one or more polymer precursors undergoing radical chain polymerization different from the acrylates, for example thiols.

The acrylate-based pre-seal according to the invention contains a monomer defined by $CH_2$=CR1-COOR2 and/or a polymer precursor derived from the monomer $CH_2$=CR1-COOR2, R1 being a first group and R2 a second group.

R1 is preferably H— or CH3-. The pre-seal thus preferably comprises, notably as sole type of precursors of acrylate polymer, acrylate and/or methacrylate monomers or derivatives of acrylate and/or methacrylate monomers, for reasons of steric hindrance, as some other group that is too large might prevent other molecules reacting with the latter. R2 optionally contains other acrylate function(s).

We may mention for example as precursors of acrylate or methacrylate polymer: ethyl methacrylate, butyl methacrylate, isobutyl methacrylate, hexyl methacrylate, isodecyl methacrylate, lauryl methacrylate, phenyl methacrylate, ethyl acrylate, methyl acrylate, butyl acrylate, isobutyl acrylate, hexyl acrylate, isodecyl acrylate, lauryl acrylate, phenyl acrylate, isopropyl acrylate, isobutyl acrylate, octadecyl acrylate.

The pre-seal preferably does not comprise (additional) polymer precursor(s) that polymerize(s) with the moisture of the air such as the cyanoacrylates.

It may moreover be preferable to select the polymer precursors of seal (or of composition) for obtaining an acrylate polymer (from one or more acrylate units) rather than a copolymer (urethane-acrylate copolymer, etc.).

The pre-seal is preferably monocomponent, i.e. there is no need to apply two products.

The pre-seal can preferably contain isobornyl acrylate.

The pre-seal can comprise, in total weight of pre-seal, at least 10 wt % or even 30 wt % of polymer precursor(s) notably of acrylate (type).

Other conventional constituents of the pre-seal are for example:
  at least one filler, typically a powder, for example inorganic, preferably selected from silica, alumina, calcium carbonate and mixtures thereof, said filler serving for example for adjusting the coefficient of thermal expansion, the viscosity, and for decreasing the solubility of the liquid crystals in the seal, one or more crosslinking agents: photoinitiator, thermal initiator, typically less than 5% of the total weight of the pre-seal.

It should be noted that even if it is a question of acrylate(s) for the seal as well as for the matrix, the seal (in the form of strip) is more adhesive than the matrix and serves in particular for holding the two glasses sufficiently when they are mineral. Thus, it is not necessarily the same acrylate or acrylates.

After step (d), it is extremely difficult or even impossible to separate the glasses glued together by the seal.

The seal according to the invention is necessarily crosslinked. Crosslinking of the seal means the formation of a three-dimensional network.

The acrylate composition must meet other requirements such as controlled phase separation with the liquid crystals to form a PDLC layer of liquid crystals that has good performance.

The matrix according to the invention can be simply polymerized or even partially crosslinked.

The composition according to the invention contains a monomer $CH_2=CR'1\text{-}COOR'2$ and/or a polymer precursor derived from the monomer $CH_2=CR'1\text{-}COOR'2$, R'1 being a first group and R'2 a second group.

R'1 is preferably H— or CH3-. The composition thus preferably comprises, notably as sole type of acrylate precursors, acrylate or methacrylate monomers or derivatives of acrylate or methacrylate monomers, for reasons of steric hindrance, since another group that is too large might prevent other molecules reacting with the latter. R'2 optionally contains other acrylate function(s).

We may mention for example as precursors of acrylate or methacrylate polymer: ethyl methacrylate, butyl methacrylate, isobutyl methacrylate, hexyl methacrylate, isodecyl methacrylate, lauryl methacrylate, phenyl methacrylate, ethyl acrylate, methyl acrylate, butyl acrylate, isobutyl acrylate, hexyl acrylate, isodecyl acrylate, lauryl acrylate, phenyl acrylate, isopropyl acrylate, isobutyl acrylate, octadecyl acrylate.

The composition according to the invention preferably contains a mixture of ethylhexyl acrylate, hexanediol diacrylate and acrylate oligomers.

The composition according to the invention preferably does not comprise (additional) polymer precursor that polymerizes with the moisture of the air such as the cyanoacrylates.

The composition according to the invention is preferably monocomponent, like the pre-seal.

The composition according to the invention also contains at least one crosslinking agent (photoinitiator, thermal initiator etc.). We may mention as an example of composition the product MXM 035 sold by Nematel.

The composition according to the invention can comprise, in total weight of composition, from 20 to 80 wt % of polymer precursor(s) (notably of the acrylate type) and preferably from 30 to 70 wt %.

The crosslinking of the seal must not impede subsequent or simultaneous polymerization of the matrix, or polymerization of the matrix must not impede subsequent crosslinking of the seal.

It is preferable, however, for the seal to crosslink and the matrix to polymerize in the same way:
thermal,
under UV, or even in one operation and rapidly, preferably less than 30 minutes or even 15 minutes, for integration in an industrial line.

The kinetics of polymerization of the matrix and crosslinking of the seal can thus be of the same order of magnitude. Thus, the composition comprises a polymerizing agent and the pre-seal comprises a crosslinking agent activatable in the same way, preferably by supply of energy: photoinitiator, thermal activator etc.

The method according to the invention can envisage, prior to assembly of the first and second sheets of glass, the formation of vent(s) in the strip formed in step a) each defining seal ends, by discontinuous application of the adhesive seal material (pre-seal) and/or by continuous application of the adhesive seal material and creation of interruptions in the strip forming the vent or vents. After assembly, it preferably comprises application of an additional material of acrylate-based polymer precursor(s) and formation of a bond, notably a bridge, between the ends of the strip.

Thus, preferably at least two vents are positioned opposite a first sheet edge (sheet with straight or curved edges) and preferably at least two other vents opposite a second edge opposite the first edge, these edges corresponding to the edges of the direction of calendering (direction perpendicular to the calender rolls), in the case of calendering. It is also possible to only make vents on one side, which will be the calendering end side.

Notably in the case of pressing, at least two vents are thus positioned opposite a third sheet edge adjacent to the first edge (and to the second edge) and at least two other vents opposite a fourth edge opposite the third edge.

"Additional acrylate-based material" means that the additional material comprises, in total weight of polymer precursor(s), at least 50 wt % of precursor(s) of acrylate polymer.

Preferably the additional material according to the invention contains, in total weight of polymer precursor(s), at least 60% or even at least 70% and preferably at least 80% or even at least 90% of precursor(s) of acrylate polymer and even 100%.

The additional material can be free from precursor of epoxy polymer or even more broadly free from ionically polymerizing polymer precursor, in particular if this material is (at least partly) between the first and second electrodes. The additional material can be of said pre-seal material thus forming continuity of material.

The additional material according to the invention is not necessarily (at least partly) between the first and second electrodes, for example when the pre-seal is on the edge of the first and second electrodes.

The crosslinking of the seal, the polymerization of the matrix as well as the crosslinking of additional material can take place in a UV or even thermal step. The invention also relates to a multiple glazing unit with variable diffusion by liquid crystals, preferably obtained as defined above, having:

first and second sheets of glass, preferably mineral glass, held at the edge of their internal faces by an adhesive seal based on crosslinked polymer delimiting a space called active space, on the internal faces, first and second electrodes provided with energy supply, and in the active space, between the first and second electrodes (directly or indirectly), a PDLC layer containing liquid crystals in the form of (micronic) droplets dispersed in a polymer matrix, the PDLC layer being in contact with the adhesive seal and preferably comprising spacers, the crosslinked seal being free from epoxy polymer, the crosslinked polymer of the seal preferably being an acrylate-based polymer, and the matrix being free from epoxy polymer and the polymer of the matrix being an acrylate-based polymer.

"Matrix containing an acrylate-based polymer" means that the matrix comprises, in total weight of polymer, at least 50 wt % of acrylate polymer.

The matrix according to the invention preferably contains, in total weight of polymer, at least 60% or even at least 70% and preferably at least 80% of acrylate polymer.

"Seal of crosslinked acrylate-based polymer" means that the seal comprises, in total weight of polymer, at least 50% of acrylate polymer.

The seal according to the invention preferably contains, in total weight of polymer, at least 60% or even at least 70% and preferably at least 80 and even 90% of acrylate polymer and even 100%.

Advantageously:
the seal according to the invention comprises, as polymer(s), one or more acrylate polymers notably an acrylate mixture and/or a methacrylate mixture,
and/or the seal comprises an acrylate polymer that is derived from isobornyl acrylate,
the matrix according to the invention comprises, as polymer(s), one or more acrylate polymers notably derived from ethylhexyl acrylate, or hexanediol diacrylate.

The crosslinked seal does not cause excessive electricity consumption and the performance of the glazing unit is satisfactory owing to the choice of acrylate-based matrix.

The seal according to the invention at the very least can comprise, in total weight of polymers, less than 5 wt % of epoxy polymer or better still less than 1 wt % of epoxy polymer. The seal according to the invention can even comprise, in total weight of polymers, less than 5 wt % of polymer(s) polymerizing ionically or better still less than 1 wt % of polymer(s) polymerizing ionically.

The matrix according to the invention at the very least can comprise, in total weight of polymers, less than 5 wt % of epoxy polymer or better still less than 1 wt % of epoxy polymer. The matrix according to the invention can even comprise, in total weight of polymers, less than 5 wt % of polymer(s) polymerizing ionically or better still less than 1 wt % of polymer(s) polymerizing ionically.

Moreover, the seal (of given width L) can preferably be interrupted in its width by one or more "vents" each defining ends of seal, and for each vent an additional material (added after pressing/calendering) forms a continuity notably a bridge between the ends of the seal, notably of said seal material thus forming continuity of material.

Preferably the additional material is applied after calendering or pressing and before polymerization of the matrix and/or crosslinking of the adhesive.

To save a step, it is preferable that the additional material crosslinks at the same time as the material of the seal and therefore for reasons of simplicity the same material is selected.

The multiple glazing unit with variable diffusion by liquid crystals as defined above can be used as glazing in vehicles or buildings.

The glazing unit according to the invention can be used notably:

as internal partition (between two rooms or in a space) in a building, in a terrestrial, aerial, or aquatic means of locomotion (between two compartments, in a taxi etc.),
as glazed door, window, ceiling, tiling (floor, ceiling),
as side, roof glazing of a terrestrial, aerial, or aquatic means of locomotion,
as projection screen,
as shop facade, window notably of a counter.

Naturally, the glazing unit according to the invention can form part or the whole of a partition and another window (transom type etc.).

Moreover, the spacers in the PDLC layer can preferably be of a transparent plastic. The spacers determine the thickness of the layer of liquid crystals. The spacers are preferably of material with refractive index close to the refractive index of the matrix of the layer of liquid crystals. The spacers are for example in the form of beads.

The electrodes are not on external faces for reasons of safety and to reduce the operating voltage.

Figure 2:
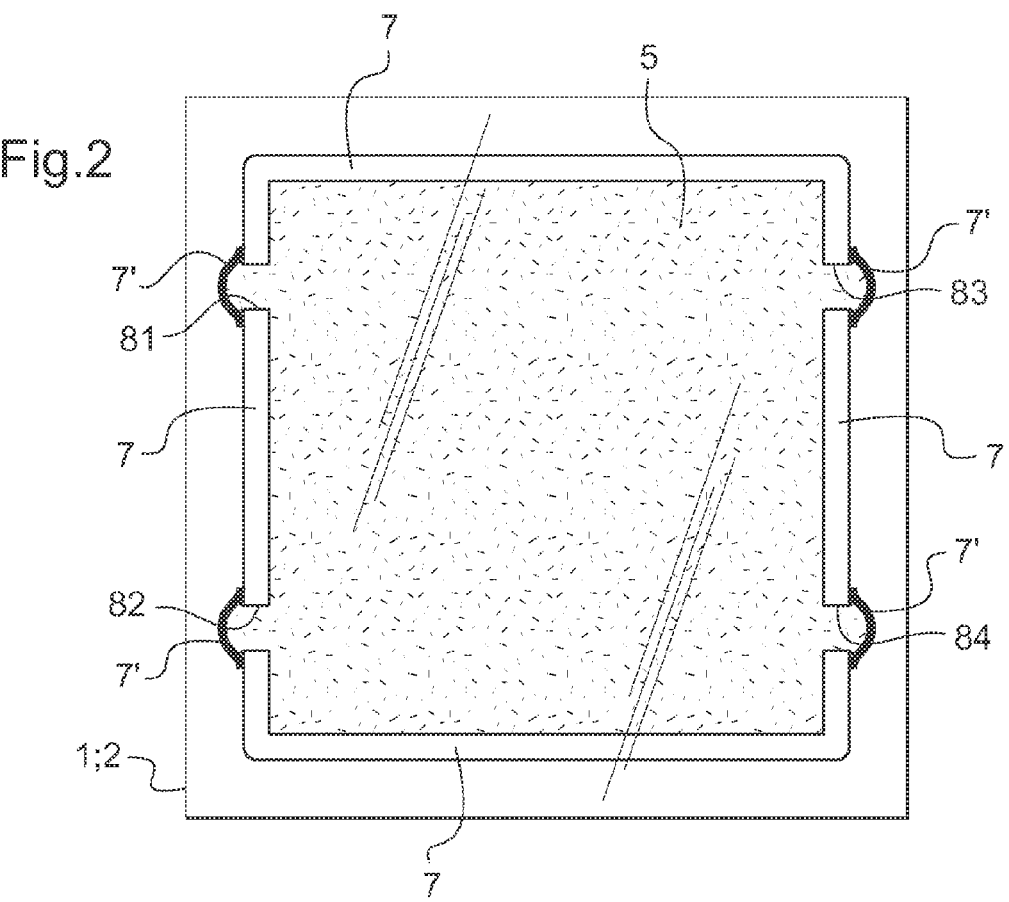

Other details and features of the invention will become clear from the detailed description given below, referring to the appended drawings where:

FIG. 1 shows a schematic sectional view of a multiple glazing unit with variable diffusion by PDLC according to the invention, FIG. 2 shows a schematic top view of the multiple glazing unit with variable diffusion by PDLC according to the invention showing in particular the seal and the vents, FIG. 3 shows a schematic top view of the multiple glazing unit with variable diffusion by PDLC according to the invention showing in particular the seal and the vents in a variant of FIG. 2, FIG. 4 shows a schematic top view of the manufacture of the multiple glazing unit with variable diffusion by PDLC according to the invention showing in particular the seal and the vents.

The embodiment example presented in FIG. 1 shows the design of the multiple glazing unit with PDLC layer according to the invention in a first embodiment.

Electrically conducting transparent layers 3, 4 with a thickness of about 20 to 400 nm, with external surface 41, 31 of indium and tin oxide (ITO) for example, are arranged on the internal faces 11, 21 of two sheets of float glass 1 and 1'. The layers of ITO have a surface resistance between 5Ω/□ and 300Ω/□. Instead of the layers of ITO, it is also possible to use, with the same aim, for the first and/or the second electrode, other layers of electrically conducting oxide or silver stacks, whose surface resistance is comparable.

A layer 5 of liquid crystals is positioned between the electrode layers 3 and 4. More precisely, the layer 5 of liquid crystals is PDLC and contains liquid crystals in the form of microdroplets dispersed in a polymer matrix. The PDLC layer 5 also contains spherical spacers of transparent polymer. The thickness of layer 5 is for example 20 µm and can typically vary from 5 to 60 µm, preferably from 5 µm, better still 8 µm, to 30 µm.

Liquid crystals can be used such as the compound 4-((4-ethyl-2,6-difluorophenyl)-ethinyl)-4'-propylbiphenyl and 2-fluoro-4,4'-bis(trans-4-propylcyclohexyl)biphenyl for example sold by the company Merck under the reference MDA-00-3506.

On the edge, the layer of PDLC liquid crystals 5 is surrounded by an adhesive seal 7 of crosslinked polymer which serves at the same time for joining the sheets of glass 1, 1' provided with electrodes in a firm and permanent manner.

The adhesive seal material, like the matrix, contains an acrylate-based polymer and is free from epoxy to avoid any excessive electricity consumption.

More precisely, the adhesive seal material is obtained from a mixture of isobornyl acrylate monomers, 2-hydroxyethyl methacrylate phosphate and acrylate oligomers, for example forming at least 10 wt % of the pre-seal or even at least 30%, and which also contains a filler (mineral powder) and a photoinitiator for its polymerization and UV crosslinking After crosslinking, the monomers and oligomers are polymerized and therefore are not present in the form of separate molecules.

Alternatively, Loxeal 30-60 sold by the company Solano can be used as acrylate-based, UV-crosslinkable pre-seal, if necessary adjusting the proportion of filler to adapt its viscosity.

More precisely, the matrix is obtained from a mixture of ethylhexyl acrylate, hexanediol diacrylate and acrylate oligomers and optionally thiols with a photoinitiator for UV polymerization. The composition of the matrix is for example the product MXM 035 sold by Nematel. The matrix represents from 30 to 70% of the total weight of the PDLC layer.

As shown in FIG. 2, the seal 7 is of a given width L and is interrupted by a plurality of vents 81 to 84 each defining ends of seal 71 to 74'.

More precisely, the seal 7 is interrupted by two vents 81 and 82 opposite a first edge of the glazing unit and by two other vents 83, 84 opposite a second edge opposite the first edge, these edges corresponding to the edges of the direction of assembly of the glasses by calendering. For each vent, an additional, preferably adhesive material 7' forms a bond, for example a bridge between the adjacent ends of the seal, preferably based on acrylate polymer and free from epoxy or even consisting of said seal material thus forming continuity of material as shown in FIG. 3.

In the "OFF" state, i.e. before application of a voltage, this liquid crystal glazing unit 100 is translucent, i.e. it transmits light but is not transparent. Once a sinusoidal voltage is applied between the two electrodes, the PDLC layer is transformed to the transparent state, i.e. in which vision is unimpeded.

Naturally, for certain applications it may alternatively be desired that in the "ON" state, the electrically controllable PDLC glazing unit is of the mirror type, or semi-reflecting, or tinted etc., and in that case the functional element or elements necessary for this are added and/or one of the electrodes is adapted (becoming for example semi-reflecting or reflecting of the mirror type) and/or the color of one of the sheets of glass is adapted.

The electrically controllable liquid crystal glazing unit is manufactured using a procedure described in detail below.

In industrial equipment for continuous coating, using the magnetic-field-assisted cathodic spraying process, sheets of float glass according to the invention are coated in successive chambers for spraying a transparent layer of ITO with an approximate thickness of 100 nm. Other transparent layers can be used as an alternative.

Two separate sheets of glass of equal size and having the desired dimensions are cut from a large sheet of glass coated in this way and are prepared for carrying out the treatment. The two separate sheets of glass cut to the desired dimensions first undergo a washing operation.

The composition of the layer of PDLC liquid crystals mixed with the spacers is then applied on the first electrode without covering the peripheral edges of the sheet. Application is for example carried out dropwise, thus allowing fine adjustment of the amount applied.

More precisely, the composition contains a mixture of ethylhexyl acrylate, hexanediol diacrylate and acrylate oligomers and optionally thiols, also with a photoinitiator for UV polymerization. The composition of the matrix is for example the product MXM 035 sold by Nematel. Other examples of compositions, based on acrylate and mercaptan, are described in U.S. Pat. No. 4,891,152.

To form the adhesive seal 7, a material called pre-seal containing precursors of the crosslinked polymer forming the seal is similarly applied directly along the edge of the sheet of glass 24 before or after deposition of the composition of the layer with PDLC liquid crystals. The pre-seal forms a strip which is or will be in contact with the composition of the layer of PDLC liquid crystals. More precisely, the adhesive seal material contains a mixture of isobornyl acrylate, 2-hydroxyethyl methacrylate phosphate and acrylate oligomers, for example forming at least 10 wt % of the pre-seal or even at least 30 wt % of the pre-seal, and which also contains a filler (mineral powder) and a photoinitiator for polymerization and UV crosslinking.

As shown in FIG. 4, it is envisaged to form a plurality of vents 81 to 84 of the seal with size and distribution suitable for removing the excess of the layer of liquid crystals and/or for evacuating the air, the vents 81 to 84 each defining two adjacent ends 71 to 74' of seal 7. Moreover, to do this, application of the seal material is either discontinuous, or continuous and is then followed by creation of the vents (by removal of material 7).

Preferably at least two vents are positioned on the front calendering edge and at least two vents on the rear calendering edge. The number of vents depends on the size of the glazing unit. The width of the vents is for example 8 mm.

The second glass is placed on the first and we proceed to calendering (or as a variant, to pressing).

The pre-seal 7 and the layer of PDLC liquid crystals 5 are compressed to the thickness of the spacers. The vents 81 to 84 therefore serve for evacuating the air as calendering proceeds, and/or for removing any excess of layer of liquid crystals.

The next step envisaged is application of the additional material 7', forming a bridge between the ends of the seal 71 to 74' preferably based on precursor of acrylate polymer and free from precursor of epoxy and for example consisting of said seal material, thus forming continuity of material.

The operation of polymerization of the matrix and of crosslinking of the adhesive seal and of the additional material is then carried out by irradiation with UV light.

The invention claimed is:

1. A method for producing a multiple glazing unit with variable diffusion by liquid crystals comprising:
applying, on a first electrode arranged on an internal face of a first substrate, a material called pre-seal containing at least one precursor of a crosslinked polymer so as to form a strip, delimiting a space, the pre-seal being applied to form an adhesive seal upon cross-linking;
depositing, on the first electrode, a liquid crystal composition containing liquid crystals in a polymer matrix, the polymer matrix comprising the at least one precursor of the crosslinked polymer;
assembling the first substrate with a second substrate so the internal face of the first substrate faces opposite an internal face of the second substrate, wherein assembling comprises at least one of calendering and pressing, such that the pre-seal in the form of the strip is in contact with the liquid crystal composition, thereby providing an assembly; and after assembling, at least one of irradiating the assembly with ultraviolet radiation (UV) and heating the assembly so as to crosslink the pre-seal and polymerize the liquid crystal composition, wherein the pre-seal is based on acrylate and free from precursor of epoxy polymer and the liquid crystal composition is based on acrylate and free from precursor of epoxy polymer.

2. The method for producing a multiple glazing unit with variable diffusion by liquid crystals as claimed in claim 1, wherein the pre-seal is free from ionically polymerizing polymer precursor and the liquid crystal composition is free from ionically polymerizing polymer precursor.

3. The method for producing a multiple glazing unit with variable diffusion by liquid crystals as claimed in claim 2, wherein the pre-seal contains, in total weight of polymer precursor(s), at least 80 wt % of precursor(s) of acrylate polymer.

4. The method for producing a multiple glazing unit with variable diffusion by liquid crystals as claimed in claim 1, wherein the pre-seal contains, in total weight of polymer precursor(s), at least 90 wt % of precursor(s) of acrylate polymer.

5. The method for producing a multiple glazing unit with variable diffusion by liquid crystals as claimed in claim 1, wherein the pre-seal contains at least one of a monomer defined by $CH_2=CR1\text{-}COOR2$ and a derivative of the monomer $CH_2=CR1\text{-}COOR2$, R1 being a first group which is H— or CH3-, and R2 being a second group optionally containing other acrylate functions, and wherein the liquid crystal composition contains a monomer defined by at least one of $CH_2=CR'1\text{-}COOR'2$ and a derivative of the monomer $CH_2=CR'1\text{-}COOR'2$, R'1 being a first group which is H— or CH3-, and R'2 being a second group optionally containing other acrylate functions.

6. The method for producing a multiple glazing unit with variable diffusion by liquid crystals as claimed in claim 1, wherein the liquid crystal composition contains, in total weight of polymer precursor(s), at least 70 wt % of precursor(s) of acrylate polymer.

7. The method for producing a multiple glazing unit with variable diffusion by liquid crystals as claimed in claim 1, wherein the liquid crystal composition contains a mixture of ethylhexyl acrylate, hexanediol diacrylate, and acrylate oligomers.

8. The method for producing a multiple glazing unit with variable diffusion by liquid crystals as claimed in claim 1, further comprising, before assembling, forming vent(s) in the strip formed by application of the pre-seal, each vent(s) defining ends of the pre-seal, wherein forming vent(s) comprises at least one of discontinuously applying the pre-seal and continuously applying the pre-seal and subsequently creating interruptions in the strip so as to form one or more vents.

9. The method for producing a multiple glazing unit with variable diffusion by liquid crystals as claimed in claim 8, further comprising, after assembling, applying an additional material of acrylate-based polymer precursor(s) so as to form a bridge, between the ends of the vent(s), the additional material being free from precursor of epoxy polymer.

10. The method for producing a multiple glazing unit with variable diffusion by liquid crystals as claimed in claim 9, further comprising crosslinking the additional material simultaneous with crosslinking the pre-seal and polymerization of the liquid crystal composition.

11. The method for producing a multiple glazing unit with variable diffusion by liquid crystals as claimed in claim 1, wherein the first substrate and second substrate are each glass.

12. The method for producing a multiple glazing unit with variable diffusion by liquid crystals as claimed in claim 1, wherein applying the pre-seal comprises applying the pre-seal about edges of the first substrate so as to delimit the space between the edges.

13. A multiple glazing unit with variable diffusion by liquid crystals comprising:

first and second sheets of glass each having an internal face, the first and second sheets of glass being held at an edge of the internal faces by an adhesive seal based on crosslinked polymer, said adhesive seal delimiting a space called an active space, on the internal faces of the first and second sheets of glass, first and second electrodes provided with energy supply, and in the active space, between the first and second electrodes, a PDLC layer containing liquid crystals in the form of droplets dispersed in a polymer matrix, the PDLC layer being in contact with the adhesive seal, the adhesive seal also being between the electrodes, wherein the adhesive seal is free from epoxy polymer and the polymer matrix is based on acrylate polymer and is free from epoxy polymer.

14. The multiple glazing unit with variable diffusion by liquid crystals as claimed in claim 13, wherein the adhesive seal comprises, as polymer(s), one or more acrylate polymers.

15. The multiple glazing unit with variable diffusion by liquid crystals as claimed in claim 14, wherein the adhesive seal contains, in total weight of polymer, at least 80 wt % of acrylate polymer.

16. The multiple glazing unit with variable diffusion by liquid crystals as claimed in claim 14, wherein the adhesive seal comprises an acrylate polymer derived from isobornyl acrylate and 2-hydroxyethyl methacrylate phosphate.

17. The multiple glazing unit with variable diffusion by liquid crystals as claimed in claim 13, wherein the polymer matrix comprises, as polymer(s), one or more acrylate polymers derived from ethylhexyl acrylate and hexanediol diacrylate.

18. The multiple glazing unit with variable diffusion by liquid crystals as claimed in claim 13, wherein the adhesive seal contains, in total weight of polymer, at least 80 wt % of acrylate polymer and the polymer matrix contains in total weight of polymer, at least 70 wt % of acrylate polymer.

19. The multiple glazing unit with variable diffusion by liquid crystals as claimed in claim 13, wherein the adhesive seal is positioned about edges of the first and second sheets of glass so as to delimit the active space between the edges.

20. The multiple glazing unit with variable diffusion by liquid crystals as claimed in claim 13, further comprising one or more vents formed in the adhesive seal, the one or more vents being closed by one or more bridges of an additional material that is free from epoxy polymer.

* * * * *